(12) United States Patent
Giakos

(10) Patent No.: US 6,207,958 B1
(45) Date of Patent: Mar. 27, 2001

(54) MULTIMEDIA DETECTORS FOR MEDICAL IMAGING

(75) Inventor: George C. Giakos, Fairlawn, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/117,925

(22) PCT Filed: Feb. 7, 1997

(86) PCT No.: PCT/US97/02042

§ 371 Date: Aug. 10, 1998

§ 102(e) Date: Aug. 10, 1998

(87) PCT Pub. No.: WO97/29507

PCT Pub. Date: Aug. 14, 1997

Related U.S. Application Data

(60) Provisional application No. 60/011,499, filed on Feb. 12, 1996.

(51) Int. Cl.[7] ............................... G01T 1/185; G01T 1/24
(52) U.S. Cl. .................... 250/385.1; 250/374; 250/375
(58) Field of Search .............................. 250/385.1, 394, 250/374, 370.01, 375, 372 R

(56) References Cited

U.S. PATENT DOCUMENTS

| 5,500,534 | 3/1996 | Robinson et al. ............... 250/385.1 |
| 5,596,201 | 1/1997 | Charpak . |
| 5,675,470 | 10/1997 | Gong . |
| 6,097,032 | * 8/2000 | Tanimori et al. .................. 250/374 |

FOREIGN PATENT DOCUMENTS

| 2602058 | 1/1988 | (FR) . |
| 405121036 | 5/1993 | (JP) . |

OTHER PUBLICATIONS

Position–Sensitive Detector with Microstrip Anode for Electron Multiplication with Gases, A. OED, *Nuclear Instruments and Methods in Physics Research* A263 (1988).

High Pressure Multiwire Proportional and Gas Microstrip Chambers for Medical Radiology, E.A. Babichev et al., *Nuclear Instruments and Methods in Physics Research* A360 (1995).

Applications of Gaseous Detectors in Astrophysics, Medicine and Biology, Fabio Sauli, *Nuclear Instruments and Methods in Physics Research* A323 (1992).

A Microstrip Gas Chamber with True Two–Dimensional and Pixel Readout, F. Angelini et al., *Nuclear Instruments and Methods in Physics Research* A323 (1992).

* cited by examiner

*Primary Examiner*—Seungsook Ham
*Assistant Examiner*—Richard Hanig
(74) *Attorney, Agent, or Firm*—Renner, Kenner, Greive, Bobak, Taylor & Weber

(57) ABSTRACT

The application of gas-detection principles on both dual-energy detection, such as for chest radiography and mammorgraphy, and quantitative autoradiography enhances dramatically the image quality of the digital dual-energy detector with great implications in general-purpose digital radiography, computer assisted tomography (CT), microtomography and x-ray microscopy, and offers notable advantages over film autoradiography with a higher sensitivity, much lower exposure times, as well as imaging access at the cellular level. A gas microstrip detector receives incident radiation through a subject to generate an image. The detector includes a substrate having on a first surface a plurality of alternating anodes and cathodes, a detector cathode spaced apart from and opposing the substrate, and a zone for dispensing a gaseous medium between the substrate and the detector cathode and for receiving incident radiation imparted through the subject.

41 Claims, 10 Drawing Sheets

MULTIMEDIA DETECTORS FOR MEDICAL IMAGING

This application claims benefit to U.S. provisional 60/011,499 filed Feb. 12, 1996.

TECHNICAL FIELD

The present invention is directed to x-ray digital radiography, including dual-energy imaging, computed tomography (CT), microtomography and x-ray microscopy; nuclear medicine, including quantitative autoradiography, single photon emission tomography (SPECT) and positron emission tomography (PET); and bio-optical imaging, including optical confocal microscopy and optical tomography. The invention is more particularly directed to novel gas detector media operating on gas-microstrip principles for use in these applications.

BACKGROUND OF THE INVENTION

The capture and detection of ionizing radiation in an efficient way, without significant loss or degradation of the image information, is of paramount significance in medical imaging.

Recent advances in medical detector technology make it possible for superior images to be produced by means of digital electronic techniques compared with classical film-screen techniques. In fact, considerable efforts are in progress to develop new methods of radiographic imaging that utilize recent advances in electronics and computer technology to improve diagnostic quality and to evolve new diagnositic modalities with reduced patient dose. These methods are generally known as digital radiography.

Specifically, digital radiography has many advantages over the conventional radiography such as expanded display of detector dynamic range, fast iamge acquisition and display, convenient storage, transmission and display of stored images without degradation, extended capabilities of data analysis and image processing and reduced patient dose.

Different detector technologies and beam geometries have been proposed for digital radiography, classified such as scintillator-photodiode, high-pressure gas filled detectors, scintillators-photomultiplier, kinestatic charge detector, proximity image intensifier/CCD, phosphor screen-photodiode and diode array.

Some of the disadvantages presently faced in the field relate to the relatively high initial cost of the digital radiographic systems, as well as to the limited detector resolution. The detector system should be ocnditioned by design criteria aimed at increasing spatial, temporatl resolution and contrast resolution, detective quantum efficiency (DQE) and the signal-to-noise ratio, while maintaining sufficient sampling rates. A careful design and development of the detecotr would be required to provide a beneficial impact on x-ray capture and their efficient conversion into charge carriers.

SUMMARY OF THE INVENTION

In the presetn invention gas microstrip detectors provide high spatial, contrast and energy resolution, resulting from fine collector size, double layer geometry, and high gain. A spatial reosltuion less than 25 microns may be achieved, with count rates higher than $10^7$ particles/mm$^2$.

One object of the invention is to provide a high spatial resolution, high contrast resolution, dual-energy gas microstrip detector for digital radiography which incrases image quality in digital x-ray radiography including dual energy imaging and provides superior detection of low contrast structures at equal or lower dose than film radiogrpahy.

Another object of the invention is to provide a high spatial resolution, high contrast resolution, dual-energy gas microstrip detector for digital radiography higher sensitivity and lower exposure times than film autoradiography, and which also provides imaging access at the cellular level.

According to the present invention, the applicability of gas-detection principles on both dual-energy detection, such as for chest radiography and mammography, and quantitative autoradiography may be employed in several detector embodiments. Overall, the gas-microstrip detection principles enhance dramatically the image quality of the digital dual-energy detector which may be applied to general-purpose digital radiography, computer assisted tomography (CT), microtomography and x-ray microscopy, including x-ray confocal microscopy.

Also, the same gas-detection principles offer notable advantages over film autoradiography by providing a higher sensitivity, much lower exposure times, as well as imaging access at the cellular level. Therefore, enhanced radioisotope imaging of either tissue samples, to determine radiopharmaceutical distribution at cellular levels, or of electrophoresis plates, for determining molecular weights, is enabled. In addition, the present invention is applicable to other areas of nuclear medicine, such as PET and SPECT.

In positron-emission tomography (PET) one has to efficiently detect 511 KeV annihilation gamma rays with optimal space and time resolutions. Traditionally, images obtained with PET show low contrast. Moreover, PET does not provide adequate counting statistics in an acceptable exposure time of approximately 30 minutes.

The most traditional approach to PET is to use a photo-multiplier coupled to each NaI or BGO scintillation crystal. The scintillation light (emitted in the visible range) is detected by a plurality of photomultiplier tubes in order to cover a wide solid angle with a good resolution. This increases the complexity of the detector system and associated electronics. It is obvious that high costs associated with large numbers of photomultipliers increase the cost of PET multihead systems and significantly make their use prohibited.

In image detecting systems there is also a need for a low-cost, efficient and large sized imaging detector readout. It is known to provide detectors based upon indirect conversion of x-rays or gamma rays using scintillator crystals with photodiodes or photomultipliers. However, this technology is either expensive or results in mediocre images. It is known to use charge couple device (CCD) cameras, but these have a small active area that limits significantly the area of interrogation. Furthermore, a CCD camera offers a low quantum sink a low signal-to-noise ratio especially for low contrast applications.

It has also been known in other technologies to use several semi-conductor media such CdZnTe semi-conductors, amorphous selenium CdSe, or amorphous silicon. However, these materials create other problems. For instance, a CdZnTe detector, which has a high atomic number and density that results in a high quantum efficiency, unfortunately provides a poor collection efficiency. As a result, even if the detector is characterized by optimal detector quality parameters, no optimized contacts or impurities in the material result in an inferior performance. It is highly desirable that a detector exhibit linear current-voltage characteristics. This can be achieved only if the semi-conductor medium has high resistively and the contacts are ohmic. In contrast, non-ohmic contacts (blocking contacts) lead to the formation of Schottky diode detectors. These detectors exhibit nonlinear detector characteristics which are highly undesirable. Also, injecting contacts, act as an ohmic contact at low applied electric fields, but at a high applied electric fields the detected current is space-charge limited which is an undesirable effect. Generally, several contact studies based on electrolysis gold and evaporated metallic contacts gold, indium, zinc and platinum contacts) with the CdZnTe surface passivated or passivated have been studied. However, no optimal contact formulation has yet been found.

It is also well known that the high cost of a crystal scintillator-photomultiplier/microchannel plate system makes their use prohibitive in medical imaging application where a large number of detected elements are required. Specifically, these devices can offer average-to-high quantum efficiency and/or amplification, but also with a high or even prohibitive cost by virtue of the large number of photodetective elements required. Additionally, in some applications photomultipliers are prone to unwanted stabilities due to high applied voltages or too strong magnetic fields. Such devices are used for nuclear medicine, x-ray astronomy and scientific applications.

The detection principles of the present invention may also be employed for the direct conversion of x-rays or gamma rays to an electric charge. By coupling the gas microstrip with a semiconductor substrate an efficient charge-carrier detection and collection system of virtually any size can be provided. This approach provides higher image resolution at a lower cost than current imaging systems.

In another use of the presetn invention's detection principles as gas microstrip substrate coated with a photocathode material may be coupled directly to a scintillation crystal or scintillating fiber, or indirectly via a fiber optics system. This configuration provides a low-cost alternative to conventional photomultipliers with enhanced stability and imaging capabilities. This configuration also provides an alternative to charge coupled devices (CCD) by providing a high quantum sink, a large dimensional array and high gain, features that cannot be provided by a CCD camera.

In one embodiment of the invention, dual energy radiographic detection is performed with a single x-ray exposure which produces high and low energy images simultaneously. By simultaneously providing high spatial resolution and high constraints resolution, an improved sensitivity, specificity of detection, and characterization of the tissue abnormality is obtained. Additionally, a dual energy detector may be operated under open bean or scanning beam geometry.

The foregoing and other objects of the invention which shall becomes apparent as the detailed description proceeds are achieved by a gas microstrip detector which receives incident radiation through a subject to generate an image, comprising: a substrate having on a first surface a plurality of alternating first anode means and first cathode means; a detector cathode spaced apart from and opposing the substrate first surface; and a zone for disposing a gaseous medium between the substrate and the detector cathode and for receiving incident radiation imported through the subject.

The present invention also provides a method for obtaining an image of a subject exposed to incident radiation comprising the steps of: exposing a detector to incident radiation projected through a sample, wherein the detector comprises a gas microstrip detector, including a substrate having on a first surface a plurality of alternating anode means and cathode means, a detector cathode spaced apart from an opposing the substrate first surface, and a zone for disposing a gaseous medium between the substrate and the detector cathode and for receiving incident radiation from the sample, wherein the incident radiation produces photons by ionization of the gaseous medium; absorbing the photons in said detector to form an imaging signal; and producing a digital image from the imaging signal.

Other objects of the invention are apparent from the detailed description of the invention which follows.

BRIEF DESCRIPTION OF THE DRAWINGS

FIG. 15 is a schematic representation of a microstrip detector used in positron emission tomography.

PREFERRED EMBODIMENTS OF THE INVENTION

The inventive imaging device comprises the front end of an imaging system, namely the gas microstrip detector. Gas-microstrip detectors provide ultra-high resolution, high internal gain and low noise, and high rate devices, for counting and imaging applications.

Features of the gas microstrip device include:

i. Providing an extremely high spatial resolution due to the micron or submicron size of the imaging signal collectors.

ii. Providing an extremely high position resolution in the x-y plane, if required, due to the back side sensing electrodes.

iii. Providing a high contrast resolution due to the applied dual energy detection principles.

iv. Providing high sensitivity, that implies a high detective quantum efficiency (DQE), due to the very high and noiseless internal amplification of the signal in the gas medium.

v. Providing elimination of electrostatic instabilities, due to the applied photolithiographic techniques, which utilize microstrips instead of wires.

vi. Reduced cost as compared to other microstrip semiconductor technologies.

vii. The ability to be built in very large sensitive areas.

The inventive imaging device disclosed herein may be used in conjunction with dual-energy detection techniques, quantitative autoradiography, x-ray and light microscopy, positron emission tomography, solid state devices and photoamplifiers employed in medical imaging, bio-optics, aerospace, industrial and other related applications.

GAS MICROSTRIP DETECTORS

Figure 1A:
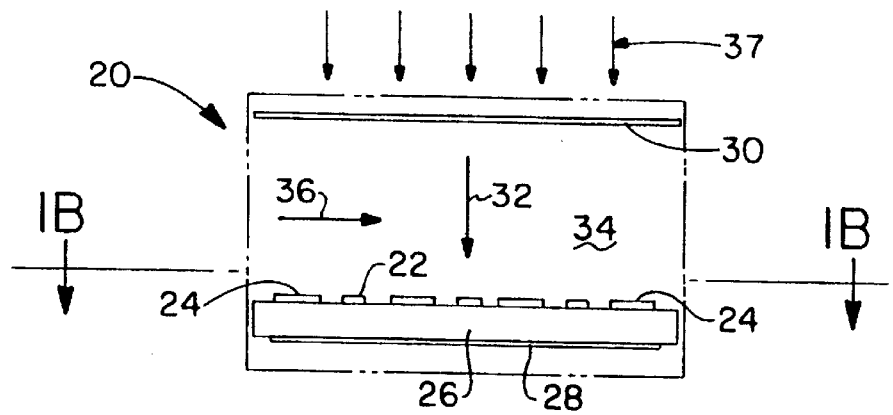
FIG. 1A is a schematic side elevational view of a gas microstrip detector.
Figure 1B:
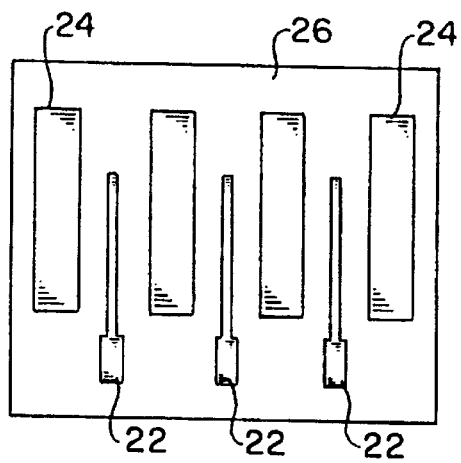
FIG. 1B is a top view of a gas microstrip detector.
Figure 1C:
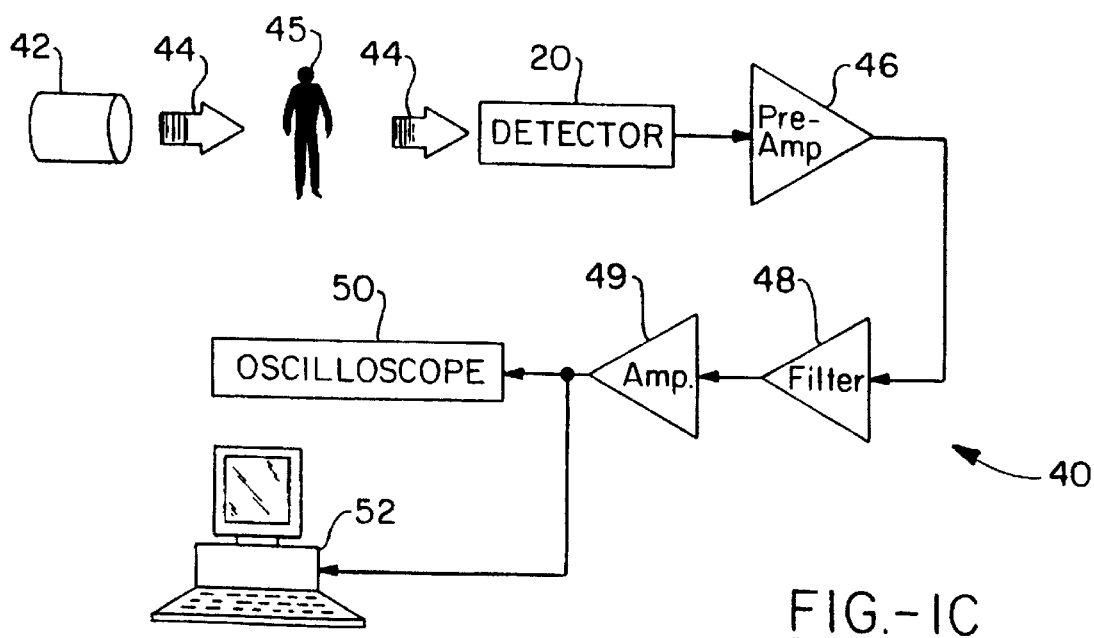
FIG. 1C is a schematic diagram of a gas microstrip imaging system.
Figure 1S:
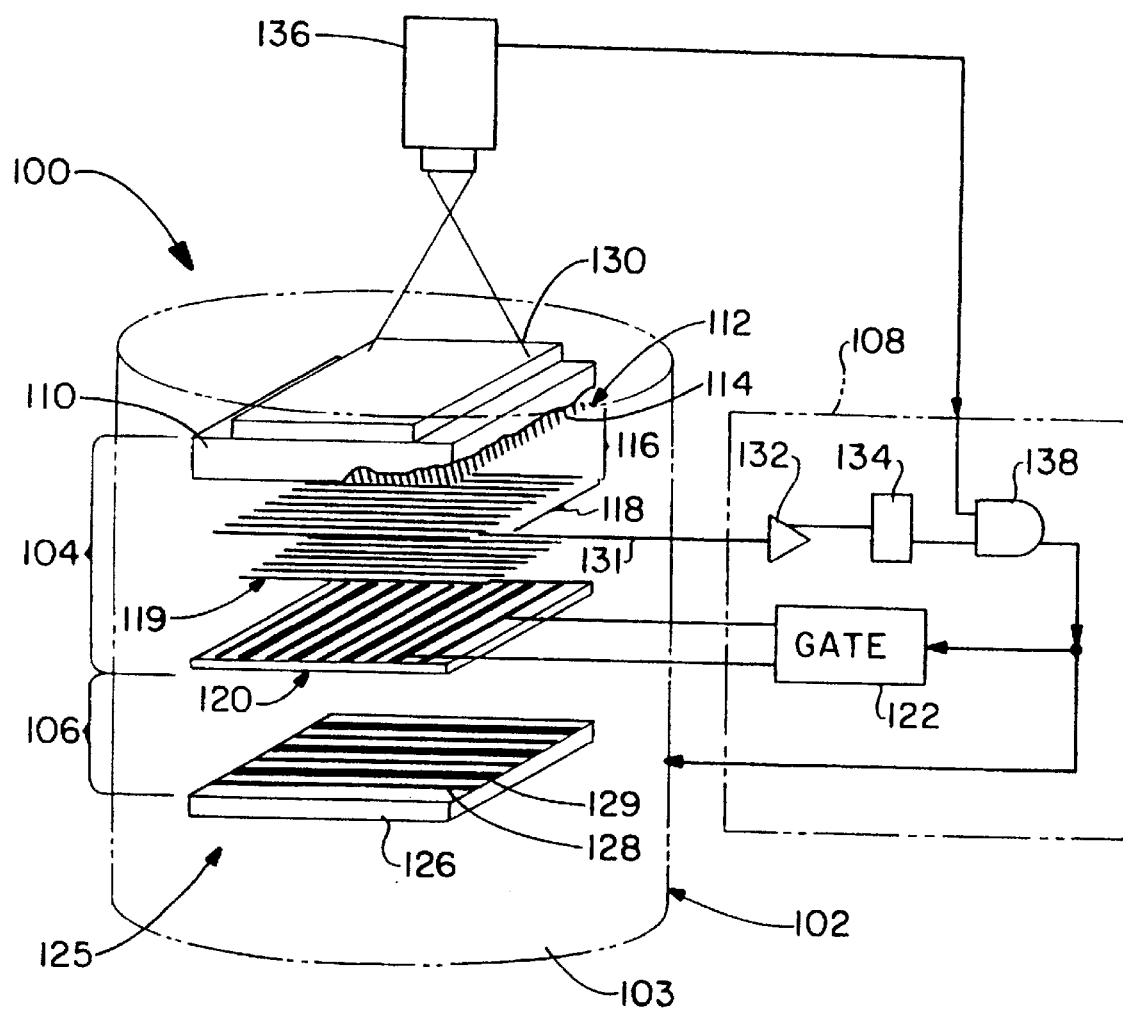
FIG. 1D is a schematic side elevational view of a gas microstrip detector coupled with x-ray directional devices.

The fabrication of microstrip detectors utilizes photolithiographic techniques commonly used to fabricate maskplates for the semiconductor industry. Views of a gas microstrip detector 20 are shown in FIGS. 1A and 1B, and a schematic diagram of a gas-microstrip detector imaging system for medical imaging is shown in FIG. 1C. The FIG. 1A configuration is referred to as a scanning beam geometry although an open face geometry is possible. The detector 20 replaces anode-cathode wires with ultrafine depositions of conductive strips, arranged in an anode-cathode pattern on an insulating or partially insulating glass substrate.

In the presetn invention, a plurality of microstrip anodes 22 are interleaved with a plurality of microstrip cathodes 24. The anodes 22 and cathodes 24 are photolithographically applied to an insulating or partially insulating substrate 26. The substrate 26 may be a conductive glass or plastic or an electrically conductive layer on the surface of a semiconductor. In one embodiment, the microstrip mask comprises conductive anode strips, which has a width in the micron range and interleaved with wider conductive cathode strips which are also in the micron range. Both anodes and cathodes may be coated with chromium, gold, other metals or the like. Depending upon the imaging application, the width of the anodes and cathodes may be varied accordingly. An electric potential (not shown) alternative between the anodes 22 and cathodes 24. On the side of the substrate 26 opposite the anode and cathodes strips 22, 24 and oriented substantially perpendicular thereto, a plurality of back electrode strips 28 may be provided depending upon the particular end use application of the detector. Depending upon the end use, the back electrode microstrips 28 may be used to provide position resolution and imaging capabilities in the x-y plane. The width of the back electrode strips 28 may be varied depending upon the imaging application. Those skilled in the art will appreciate that the substrate 26 is thin enough to allow induced signals on the back electrode strips 28. Induced signals may also be achieved by utilizing a substrate with appropriate resistively. As mentioned previously, the substrate 26 may be a conductive glass or plastic substrate with suitable electrical conduction properties or the substrate may be provided with an electrically conductive layer on the surface of an insulator by means of ion implantation or deposition of a thin film of semiconductor material. A detector cathode 30 is opposed to the substrate 26 wherein an electric field 32 may be applied between the detector cathode 30 and the plurality of back electrode strips 28.

A gas medium 34 is encapsulated between the detector cathode 30 and the substrate 26 in a manner well known in the art. The distance between the substrate 26 and the detector cathode 30 is typically in the millimeter range, although other spacing may be employed. The gaseous medium 34 may include argon, xenon, krypton and mixtures thereof, as well as such inert gases or their mixtures in combination with polar or quenching compounds in a dopant concentration. The gaseous medium 34 may be encapsulated at high pressure if required by the imaging application to provide a high quantum efficiency and a limited electron range.

A plurality of primary electrons, represented by an arrow 36, are produced by direct x-ray ionization of the gas medium 34 and are drifted toward the anodes 22. When the electrons 36 reach the electric field 32 between the respective anodes 22 and cathodes 24, the electrons 36 drift toward the appropriate cathode 24 where they experience an avalanche amplification at sufficiently high field strength, due to the quasi-dipole anode-cathode configuration.

As will become apparent, the high degree of accuracy achieved with the photolithographic techniques ensures that the detector 20 has extremely high gain over large areas which heretofore had been unavailable. With this technique it is possible to make very precise thin strip strictures (anodes and cathodes) in the micron (1/1000 millimeters) or submicron-range, up to 1–2 microns, with a precision of 0.2 microns, which adhere very well to the glass substrate. In addition, it provides a high contrast resolution due to the applied dual energy detection principles.

As seen in FIG. 1A, a plurality of x-rays 37 may be applied in planes parallel to the detector in a strip beam geometry. Alternatively, the x-rays 37 may be applied normally through the cathode 30 in an open beam geometry.

Figure 1D:
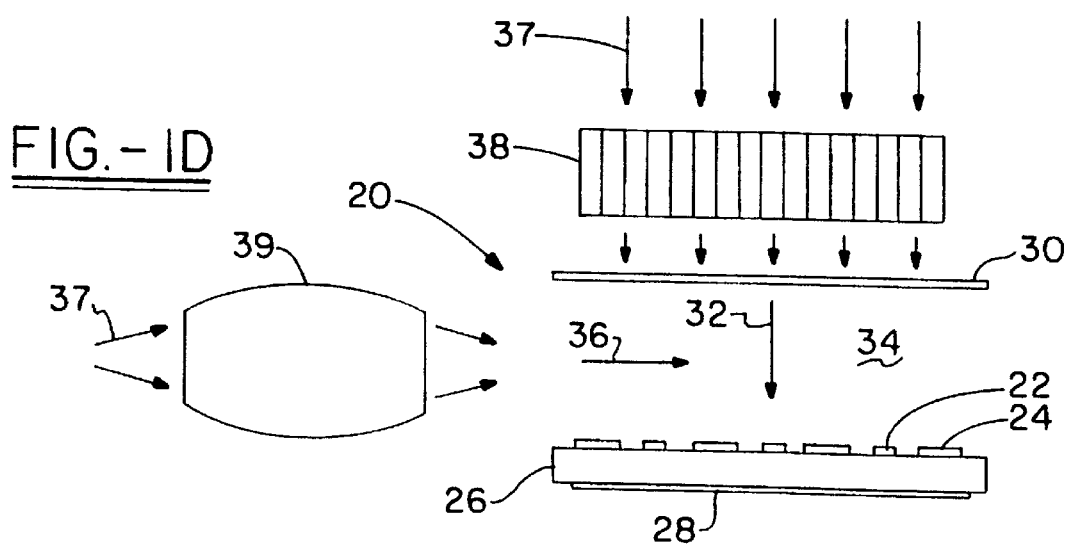

The detector 20 may also be provided with a capillary optic system 38 or a Kumakhov lens 39 disposed between a source of the x-rays 37 and substrate 26/cathode 30 as seen in FIG. 1D. These directional x-ray devices may be provided in either a strip beam geometry or an open beam geometry. The capillary optic system 38 includes a plurality of light fibers that collimates the incident light or radiation. The lower angular acceptance of capillary x-ray optics, due to the small critical angle for reflection, provides the potential for extremely efficient scatter rejection with relatively high primary transmission. A Kumakhov lens 39 also functions to collect and guide x-rays and the like into the gas medium 34. Use of these guidance mechanisms further enhances the clarity of the imaging signal. In a gas microstrip imaging system 40 of the presetn invention, shown in FIG. 1C, an x-ray tube 42 generates a plurality of x-rays 44 which impinge on a person or subject 45, that is, a biological or pharmaceutical sample, or a patient, and pass to the gas microstrip detector 20. An imaging signal produced by the detector 20 is passed to a pre-amp 46, through a filter 48 and then to an amplifier 49. The imaging signal is directed to an oscilloscope 50 for real-time display and/or a computer workstation 52 for data acquisition, analysis and storage.

Figure 2:
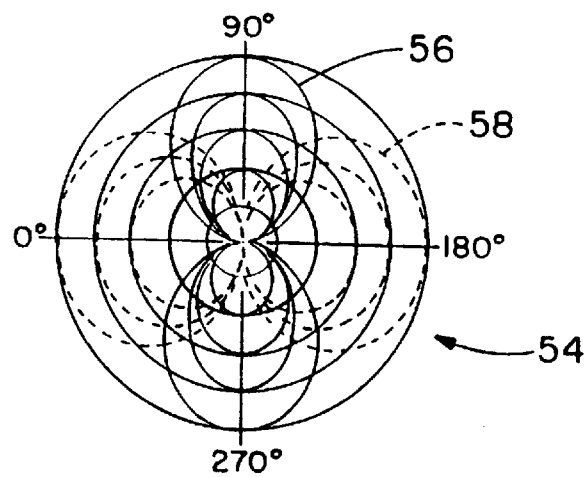
FIG. 2 is a quasi-dipole configuration of the electric field strength established between an anode-cathode pair of a gas-microstrip configuration.

FIG. 2 shows a quasi-dipole configuration 58 of the electric field strength established between an anode-cathode pair of a gas-microstrip configuration, wherein electric field lines are designated by numeral 56 and potential lines are designated by numeral 58.

DUAL-ENERGY DETECTION TECHNIQUES

Dual energy radiographic techniques have been applied to imaging for mammography and chest radiography. The dual-energy radiography removes the image contrast between any two chosen materials. By simplifying the background structure in this way, an increase in the detectability or "conspicuity" of the target is obtained.

A major limitation in conventional chest imaging techniques is the presence of unwanted interfering structures. Specifically, overlapping projections of other body structures such as ribs, can obscure or camouflage the pulmonary nodules. Therefore, tumors may not be clearly differentiated from adjacent structures.

Dual energy digital radiography permits cancellation of the displayed contrast of any two materials, such as bone and soft tissue, allowing low-contrast lesions such as such as solitary pulmonary nodule (SPN's) or diffused pulmonary nodules (DPN's) to be obtained through increased conspicuity in bone-canceled images. Also, calcified lesions may be differentiated, therefore, tumors may be clearly differentiated from adjacent structures.

This is useful since the presence of calcification in an SPN is the most important determinant of benignancy. In addition, fine, diffused calcifications are often only detectable via-dual energy techniques. Dual energy may therefore be viewed as a technique to maximize the diagnostic information content of the x-ray image.

A major limitation in conventional mammographic techniques is the presence of unwanted interfering structures. Specifically, in mammograms obtained with the compression method, normal soft tissue of breast, tumor, calcium deposits (calcifications), and other shadows may overlap one another in such a way as to mask a lesion. Therefore, tumors may not be clearly differentiated from adjacent mammary structures. With the use of mammography in dense breasts, it may be difficult to recognize the border of cancer infiltration.

Breast calcification detected in many women undergoing mammography can be either benign or malignant, which indicates the presence of breast cancer. The detection of malignant calcifications is often the only way of making an early diagnosis of cancer. Cancers may be missed, however, when calcifications are obscured by a "cluttered" background, resulting from the contrast between the soft tissues in the breast. Because of the significance that the presence of calcifications has in the diagnosis and clinical evaluation of breast cancer, such new techniques for enhancing breast images are of primary importance.

In digital dual energy mammography, the detection of calcifications may be enhanced by removing structural noise from the surrounding soft tissue in the breast. According to the invention, dual energy radiographic detection is performed with a single x-ray exposure, producing high energy and low energy images simultaneously, thus eliminating misregistration problem or patient motion problems that can be present in double x-ray exposure. A weighted subtraction of these two images will produce a digital iamge which eliminates either calcifications or soft tissue.

Figure 3:
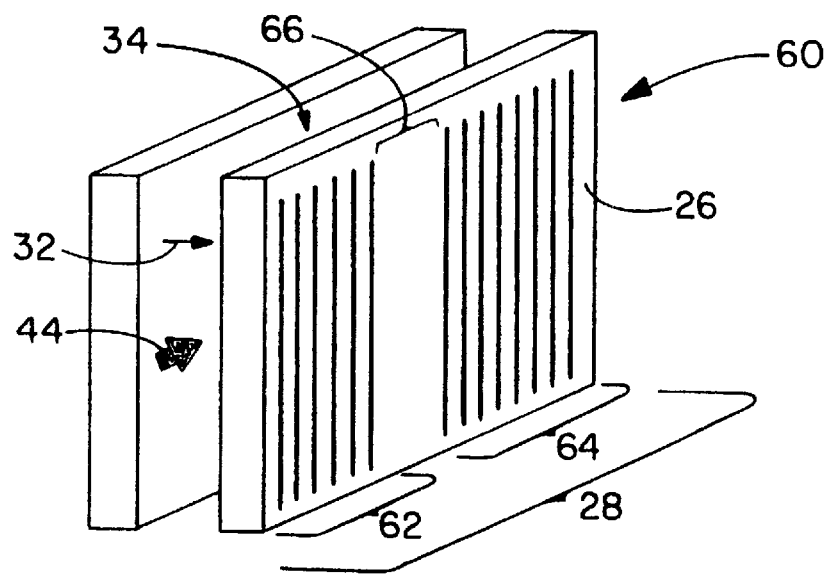
FIG. 3 is a perspective view of a dual-energy gas microstrip detector.

The principles of dual energy detection operating on gas microstrip principles are shown in FIG. 3. The contrast resolution of the system is demonstrated by means of a mammographic phantom designed to attenuate x-rays in the same way as a human breast compressed to 4.5 cm. A gas microstrip detector 60 provides a plurality of back electrode strips 28 on one side of the substrate 26 and the anodes and cathodes on the other side. The plurality of back electrode strips 28 are separated into a front microstrip zone 62, which absorbs a greater percentage of low energy x-ray photons 44, and a back microstrip zone 64 which absorbs a greater percentage of high energy x-ray photons 44. The two microstrip zones 62 and 64 are separated by a neutral zone 66 (grounded) to increase sufficiently the means energy separation of the two imaging signals generated by their respective zones. The subtraction of these two signals results in an enhanced detection of microcalcifications by removing structured noise form the surrounding soft tissue. A complete small-field of view (SFOV) imaging system is therefore enabled, through this geometry.

Figure 4:
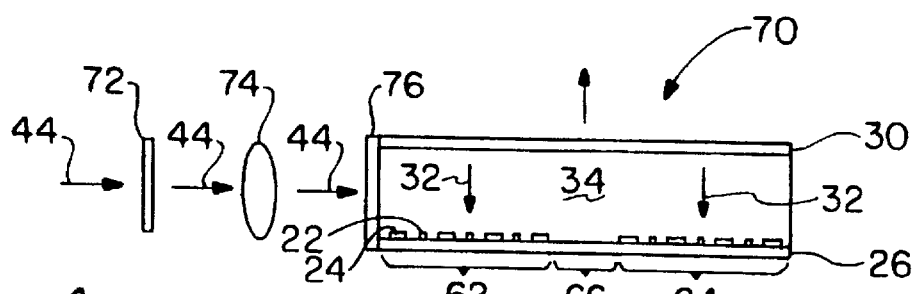
FIG. 4 is a schematic representation of a dual-energy digital radiographic system based on segmented gas microstrip detection principles.

A diagram of a dual-energy digital radiographic system based on segmented gas microstrip detection principles is shown in FIG. 4 and is designated generally by the numeral 70. A dual-energy gas-microstrip detector 70 operates by segmenting the signal-collection fingers inside the detector into the following three zones: a front zone 62, an inactive neutral zone 66 and a back zone 64. The front zone 62 produces the digital low-energy image and the back segment 64 produces the digital high-energy image. The purpose of the inactive neutral zone 66 is to harden the x-rays and thereby increase the energy separation between the low and high energy images. A prefilter material 72 with an appropriately chosen k-edge is placed adjacent to eh x-ray bute 42 so as to produce a bimodal x-ray spectrum entering the object or phantom 74. The dual-energy microstrip detector 70 comprises an aluminum x-ray window 76 which encloses the gas medium 34. The detected signals are amplified, filtered, and then displayed on a digital real-time oscilloscope.

QUANTITATIVE AUTORADIOGRAPHY

Several biological measurement and detection techniques in nuclear medicine depend on the quantitative evaluation of radio labelled substances in two-dimensional separated media. Film based techniques are inexpensive and reproducible but are limited to the study of only certain biological compounds. According to the invention, a new detector is presented which offers notable advantages over film autoradiography with a higher sensitivity, improved detection efficiency, decreased exposure times, and imaging access at the cellular level. In fact, the inventive gas-microstrip device offers exposures times over 1000 times less than film based methods, as well as higher gain and stability when compared to avalanche photodetectors and wire proportional counters. Therefore, enhanced radioisotope imaging of either tissue samples to determine radiopharmaceutical distribution at cellular levels, or of electrophoresis plates for determining molecular weights, is provided.

Figure 5:
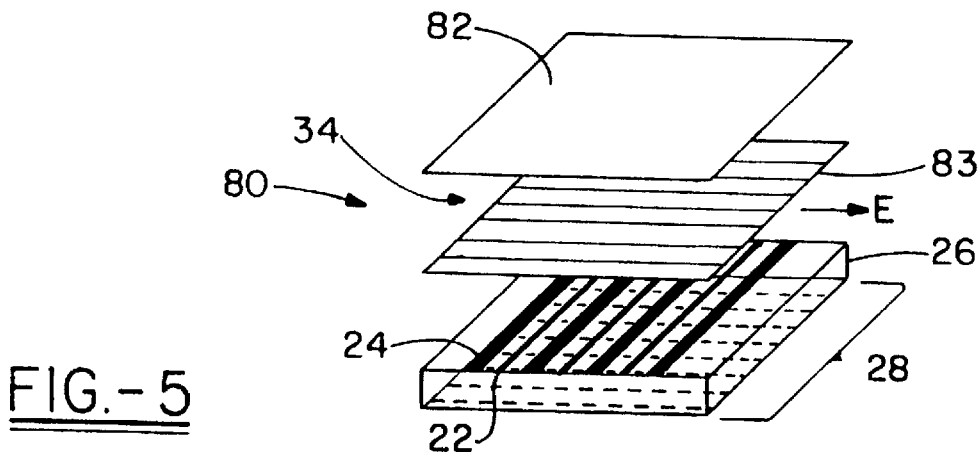
FIG. 5 is an exploded perspective view of a gas-microstrip detector for quantitative autoradiography.

An exemplary detector designed for quantitative autoradiography is shown in FIG. 5 and is designated generally by the numeral 80. The detector 80 operates in much the same manner as the other detectors presented hereinabove. In this embodiment a radioactive plate source 82 is employed to emit weak radiation which ionizes the gas medium 4 that is encapsulated between the plate source 82 and the substrate 26. A grid plate or detector cathode 83 is disposed between the plate source 82 and the substrate 26 in a plane substantially parallel thereto. In the preferred embodiment, the grid plate 83 is separated from the plate source 82 by about 0.5 mm. Of course, other spacings may be employed. The electrons generated are drifted under the influence of an applied electric field generated by the detector cathode 30 and the plurality of anodes 22. Electron amplification and collection occurs in relative proximity to the anodes 22.

QUANTITATIVE AUTORADIOGRAPHY

Figure 6:
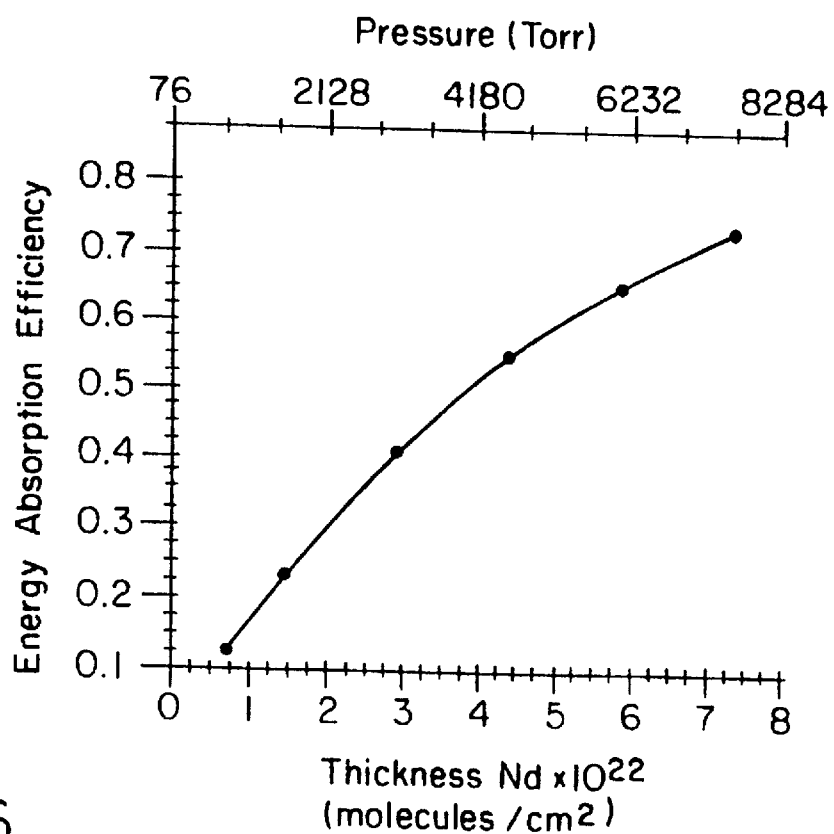
FIG. 6 is a graphical representation of the energy absorption efficiency with increasing xenon pressure (d=1 cm, E=18.6 keV) suitable for mammography and quantitative autoradiography applications.
Figure 7:
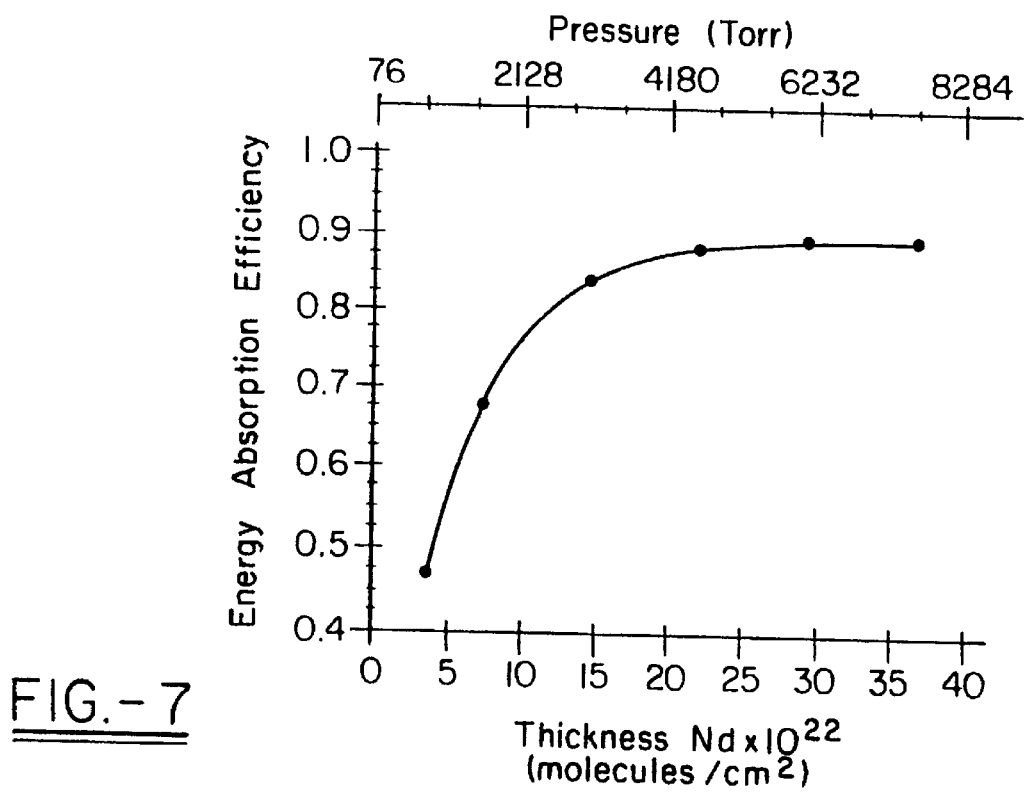
FIG. 7 is a graphical representation of the energy absorption efficiency with increasing pressure (d=5 cm E=18.6 keV).
Figure 8:
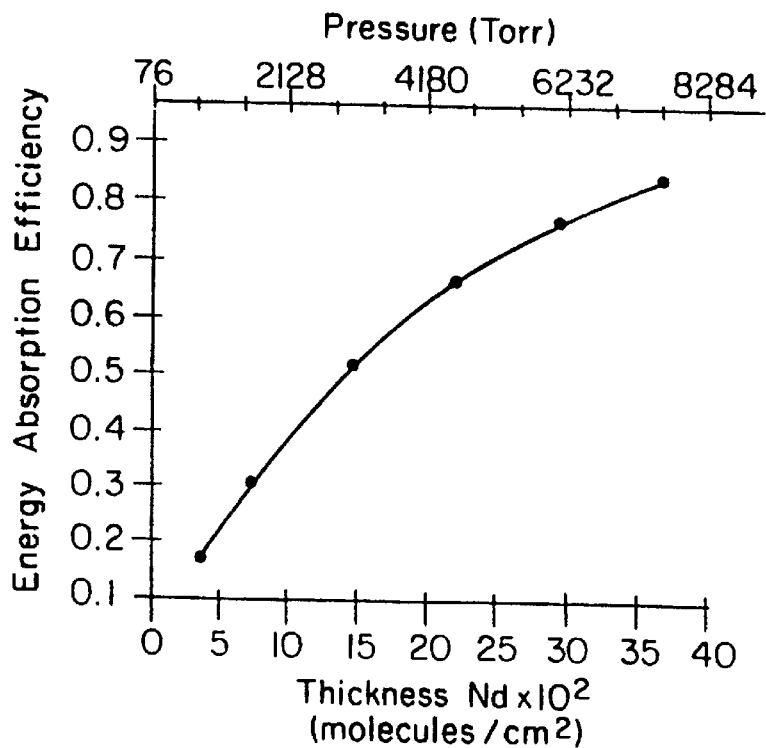
FIG. 8 is a graphical representation of the energy absorption efficiency with increasing xenon pressure (d=5 cm, E=50 keV) fluence=2200 photons/mm$^2$ suitable for chest radiography.

The energy absorption efficiencies versus operating gas pressures are shown in FIGS. 6–8. In FIGS. 6 and 7, the energy absorption efficiencies for a xenon-filled detector have been estimated at 18.1 keV (mammography and quantitative autoradiography), with an absorption depth of 1 cm and 5 cm, respectively. In FIG. 8, the energy absorption efficiency for a xenon-filled detector has been estimated at 50 kev (chest radiography), with an absorption depth of 5 cm. It is observed that energy absorption efficiencies up to 85% can be obtained for xenon gas detector media pressurized up to 10 atmospheres with a detector depth of 5 cm. Of course, higher pressures can be utilized.

Figure 9:
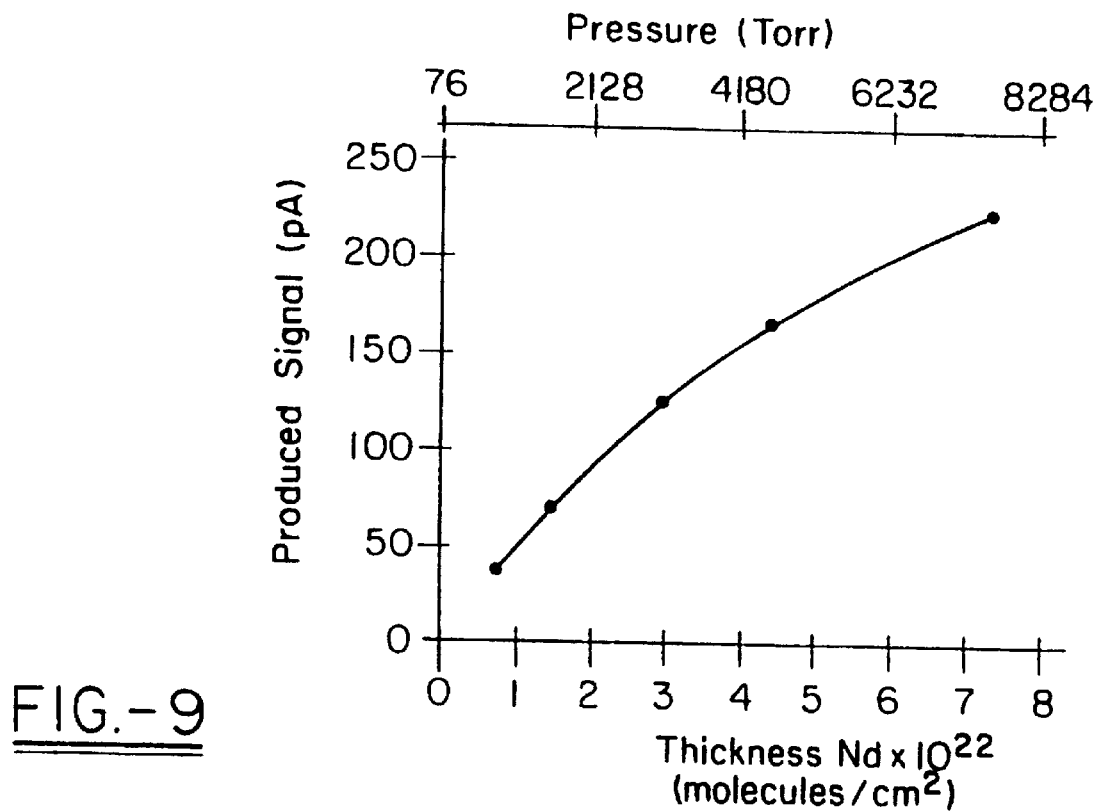
FIG. 9 is a graphical representation of the signal produced with increasing xenon pressure (d=1 cm, E=18.6 keV, fluence=2200 photons/mm$^2$) suitable for quantitative autoradiography.
Figure 10:
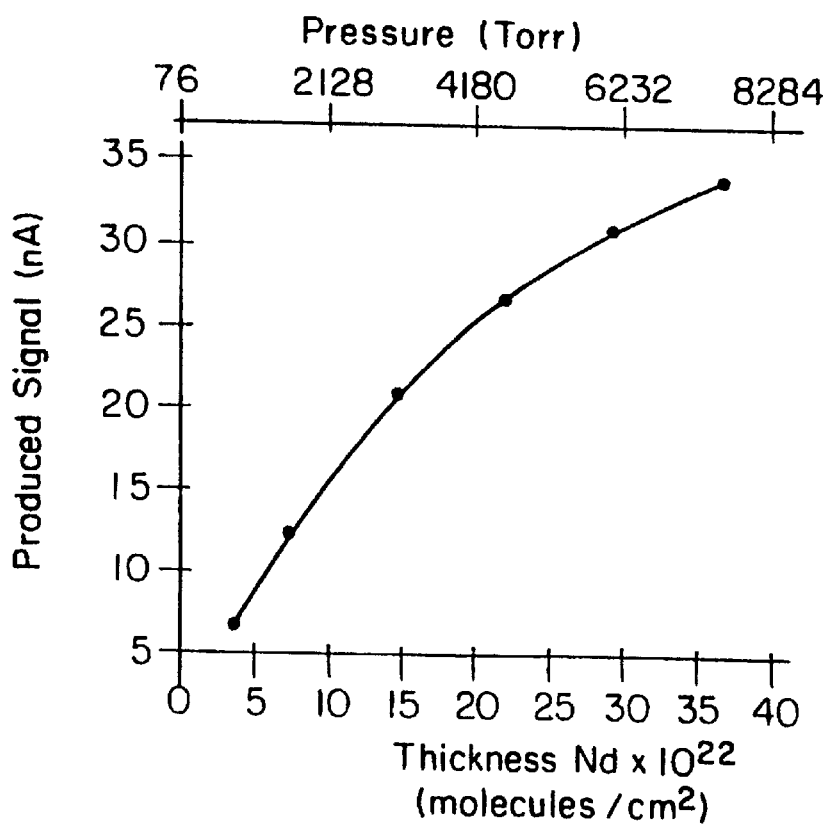
FIG. 10 is a graphical representation of the signal produced with increasing xenon pressure (d=5 cm, E=50 keV fluence=1.08×10$^5$ photons/mm$^2$) suitable for chest radiography.

The signal produced with increasing gas pressure is shown in FIGS. 9 and 10. In FIG. 9, the produced signal in a xenon gas-filled microstrip detector for an absorption depth of 1 cm, a photon fluence of 2200 photons/mm$^2$, and a gas gain of $10^3$ at 18.1 kev is shown. The produced signal in a xenon gas-filled microstrip detector for an absorption depth of 5 cm, photon fluence of $1.08 \times 10^5$ photons/mm$^2$, and a gain of $10^3$ at 50 kev is shown in FIG. 10. Although a gain of $10^3$ is assumed, gains of several magnitudes higher are possible with the microstrip detector.

Figure 11:
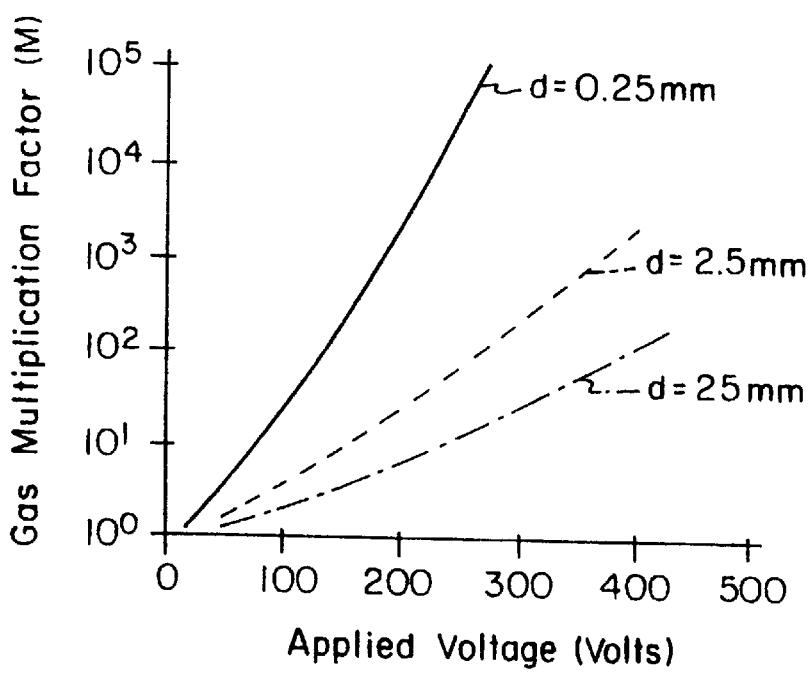
FIG. 11 is a graphical representation of the gain in argon with increasing applied voltage, at different anode-cathode distances, at 1 atmosphere.
Figure 12:
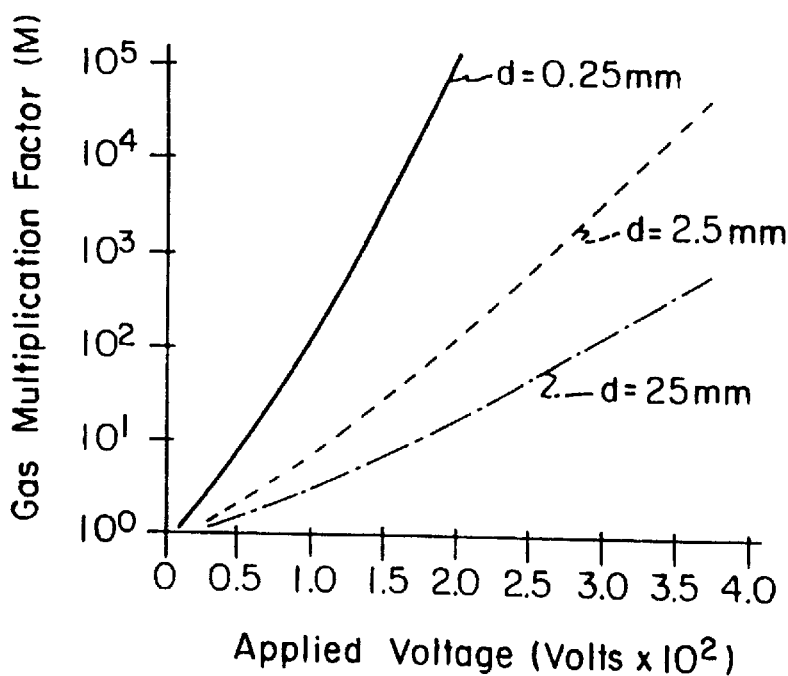
FIG. 12 is a graphical representation of the gain in xenon with increasing applied voltage, at different anode-cathode distances, at 1atmosphere.
Figure 13:
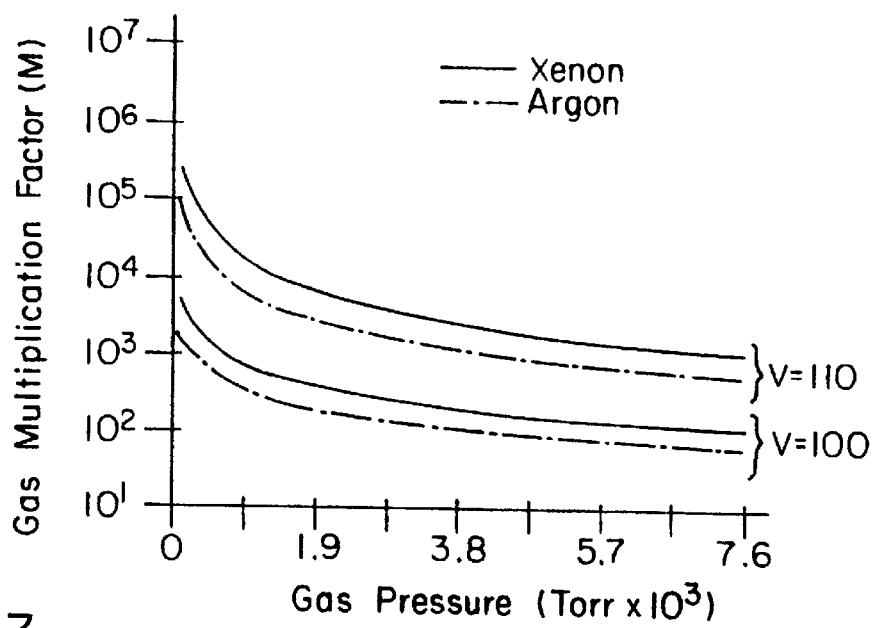
FIG. 13 is a graphical representation of the gain with increasing pressure, at different applied voltages, with an anode radius of one micron, and an anode-cathode distance of 10 microns.

In fact, the gas multiplication factors (gain) with increasing applied voltage, for argon- and xenon-filled microstrip detectors, at 1 atmosphere and different anode-cathode distances are shown in FIGS. 11 and 12, respectively. The gas multiplication factor with increasing pressure, at different applied voltages in xenon gas filled detectors, with an anode radius of one micron and an anode-cathode distance of 10 microns, is shown in FIG. 13.

Figure 14:
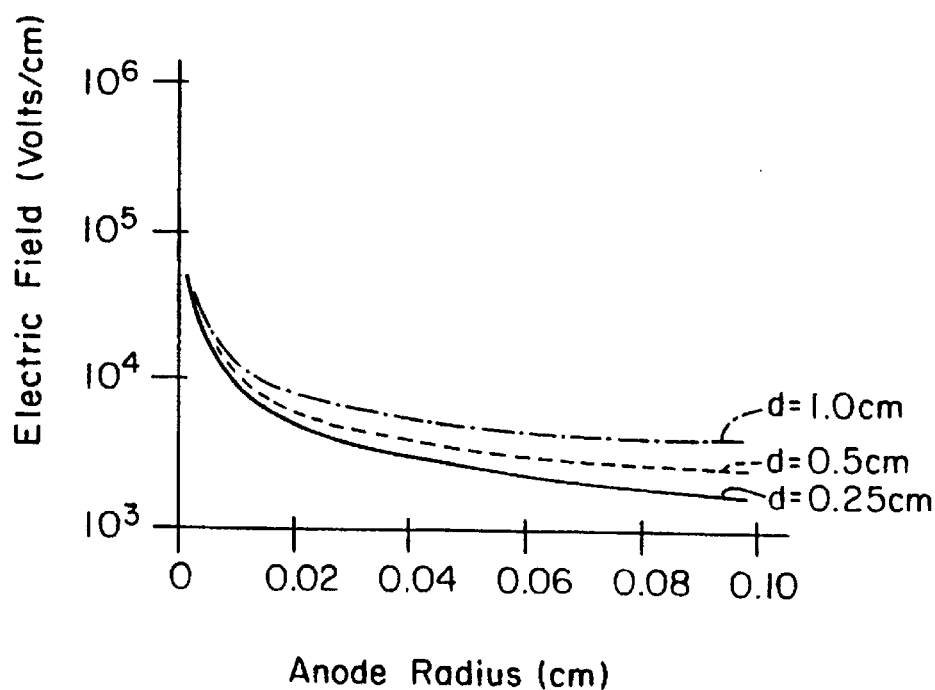
FIG. 14 is a graphical representation of the electric field on the surface of the anode with increasing anode radius, at different anode-cathode distances, at an applied voltage of 400 V.

The electric field at the surface of the anode with increasing anode radius, at different anode-cathode distances, at an applied voltage of 400 V, is shown in FIG. 14. Overall, it has been observed that the quasi-dipole configuration of the anode-cathode microstrip gives rise to a high electric-field strength that contributes to high signal gain with a relatively low applied voltage. Because of the small (submicrometer) strip size and the short clearing time of the ions, the gas-microstrip technology offers unique pulsed medical imaging applications for nuclear medicine at high rates. Also, the exposed detection techniques have unique image quality properties that enhance the current dual-energy detection techniques significantly and have an impact on the imaging quality of an x-ray digital radiographic system.

POSITRON EMISSION TOMOGRAPHY

A positron emission tomography (PET) imaging detector comprises a scintillator, such as a $BaF_2$ crystal, coupled to a low-pressure inert-gas filled tube which operates on excited state photoionization principles. The gas detector is operated in the prebreakdown regime, which can be achieved by using a relatively low bias voltage. This regime is maintained upon the application of a relatively low electric field and gives rise to excited rather than ionized atoms which characterize the gas response as excited state photoionization. The DC component of the UV photons add to the excitation produced by the bias and permits operation of the detector at slightly lower bias. Since the gas detector can operate at an extremely low bias current (nA), the prebreakdown regime may be very sensitive to changes in incident power.

According to the present invention, a PET device, designated genrally by the numeral 100, is presented in FIG. 15. The device 100 includes a photo-tube 102 which is filled with a gas 103 such as argon, xenon or the like and maintained at a low pressure. The device 100 includes a primary detection region 104, a transfer gap 106 and a detector readout circuit 108.

The primary detection region 104 provides a parallelepiped $BF_2$ crystal 110 which in this embodiment is 25×45 mm$^2$ and 8 mm thick. Of course, the crystal 110 may be any appropriately related material known for medical imaging applications. Disposed underneath the crystal 110 is a reverse bias zone 112 which consists of a grid of wires 114 which in this embodiment are 50 $\mu$m Mo wires at 0.5 mm pitch. The grid 114 is positioned about 0.5 mm away from the crystal 110 to prevent charge build up on the crystal surface. A voltage source (not shown) of about −30 V is connected to the grid 114 for this purpose. The region 104 further includes a conversion zone 116 which may be from 0.5 to 3 mm wide. A plurality of planar wires 118, which in this embodiment are 50 $\mu$m Mo wires at 0.5 mm pitch, are disposed underneath the conversion zone 116 and are maintained at a voltage of about +100 V. A preamplification grid 119 is spaced about 10 mm below the conversion zone 116. A metallic mesh of wires 120 is disposed below the preamplification zone 119. The mesh 120 may comprise a plurality of wires wherein each wire is 100 $\mu$m gold-plated tungsten alternately connected to about a ±25V source (not shown). The mesh 120 is coupled to a coincidence gate 122 in the detector readout circuit 108. It is within the scope of the present invention that the pre-amplification grid may not be required for the operation of the device 100.

The transfer gap 106, which is about 30 mm thick, includes a microstrip detector 125 which may be configured from any one of the microstrip detector embodiments presented herein. The detector includes a substrate 126 with a plurality of anodes 128 interleaved with a plurality of cathodes 129. The detector 125 is positioned underneath the mesh 120.

In operation, the PET device 100 provides a radiation source 130 that generates an annihilation radiation that is absorbed in the $BaF_2$ crystal 110 which generates UV scintillation light for ionizing preexcited gas 103 in the photo-tube 102. This produces two 511 kev gamma ray photons that are emitted in approximately opposite directions. This ionization of preexicited gas generates a large number of photoelectrons in the conversions zone 116. The preamplification grid 119 multiplies the large number of photoelectrons and generates a signal 131 that is received by the detector readout circuit 108 for a position reading according to the transfer gap 106. When a high bias voltage is applied to the mesh 120, the photoelectrons are accelerated under the influence of an applied electric field established between the mesh 120 and the detector 125. If a single coincidence event is present, then the electron avalanche is terminated at the coincidence gate 122. When a coincidence event is registered by the circuit 108, an enable or stop pulse is fed back to the coincidence gate 122. The pulse induced from the electrons is fed from the preamplification grid 119 to a preamplifier 132 and then to a constant fraction discriminator 134.

A start signal from a scintillator-photomultiplier 136, which is coupled to the radiation source 130, operates a start gate in a time-to-amplitude convector 138 while the detector 125 generates the stop pulse. The convector 134 converts a timing difference between the start signal and stop pulse for later analysis.

HYBRID SOLID STATE-GASEOUS MICROSTRIP

Figure 16:
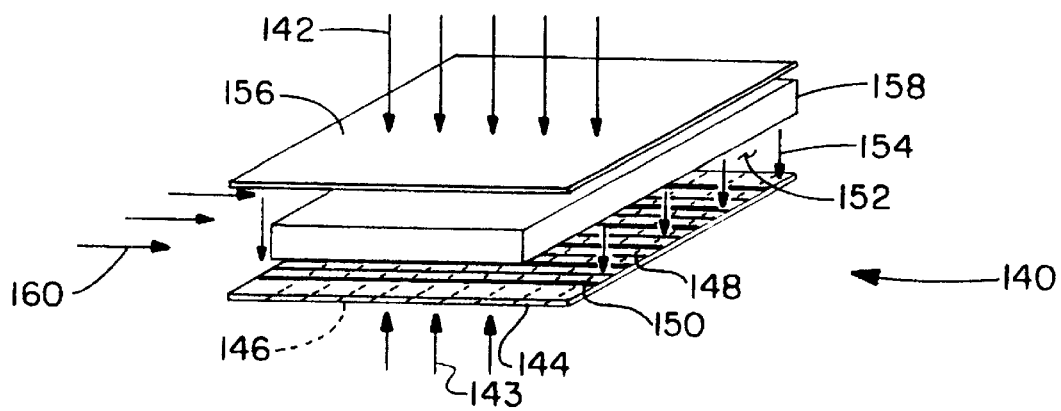
FIG. 16 is a perspective view of a hybrid solid state-gaseous microstrip.

Referring now to the FIG. 16, it can be seen that another variation of the gas microstrip detector in the form of a hybrid solid state-gaseous microstrip is designated genrally by the numeral 140.

Detector 140 operates by the direct conversion of x-rays or gamma rays, as represented by the arrows 142, to electric charge in an open beam geometry. Alternatively, x-rays 143 may be applied to the opposite side of the detector 140. A microstrip detector 140, which is similar to the embodiment presented in FIG. 1, inlcudes a substrate 144 with a plurality of back electrodes 146, and a plurality of microstrip anodes 148 interleaved with a plurality of microstrip cathodes 150. Of course, the detector 140 is received in an enclosure with noble gas 152, under an applied electric field as designated by the arrows 154 in atmospheric or substmospheric gas pressures. A plate 156 is placed in a plane substantially parallel with the substrate 144 with a semiconductor material 158 received therebetween. The plate 156 may be a high voltage plate, a contact or another microstrip. The material 158, which may be passivated or unpassivated, may be coupled directly or indirectly via a Kumakhov lens to the microstrip substrate 144.

In operation, the substrate 144 serves not only as a collector contact to the material 158, but also as an amplifier. The plate 156 may or may not be in direct contact with the material 158. If the plate 156 is not in contact with the material 158 they will be separated by the gas medium 152. Depending upon the polarity of the applied electric field, the electrons or ions can be collected, with high or low gain, respectively. Since nobel gas has a work function potential lower than that of metal, a more linear detector response can be achieved. Additionally, the present embodiment eliminates or reduces significantly the space-charge associated deleterious effects. As in the other embodiments, the primary electrons produced by direct x-ray ionization of the material 158 are drifted toward the anode strips 148 in the z-direction. When the electrons reach the field between the high voltage plate 156 and the substrate 144, the applied voltage may change polarity depending upon the collected carrier (ion or electron). For example, the electrons drift toward the appropriate anode 148 where the electrons experience an avalanche amplification at sufficiently high field strength, due to the quasi-dipole anode-cathode configuration. The ions are collected rapidly on the adjacent cathode which results in the detected image signal. Alternatively, a plurality of incident x-rays or gamma rays, designated by arrows 160, may be applied in a direction parallel to the vertical axis of the material 158 to allow the device 140 to operate in a scanning beam configuration.

This embodiment provides the advantage of direct conversion of x-rays to electric charge which provides higher image resolution. Moreover, the detector 140 provides for efficient charge collection and signal multiplication. This embodiment provides an alternative to the photodiode/CCD camera readout since it offers high quantum sink, large dimensional arrays and high gains—features that a CCD camera cannot offer.

HYBRID PHOTOAMPLIFIER

Figure 17:
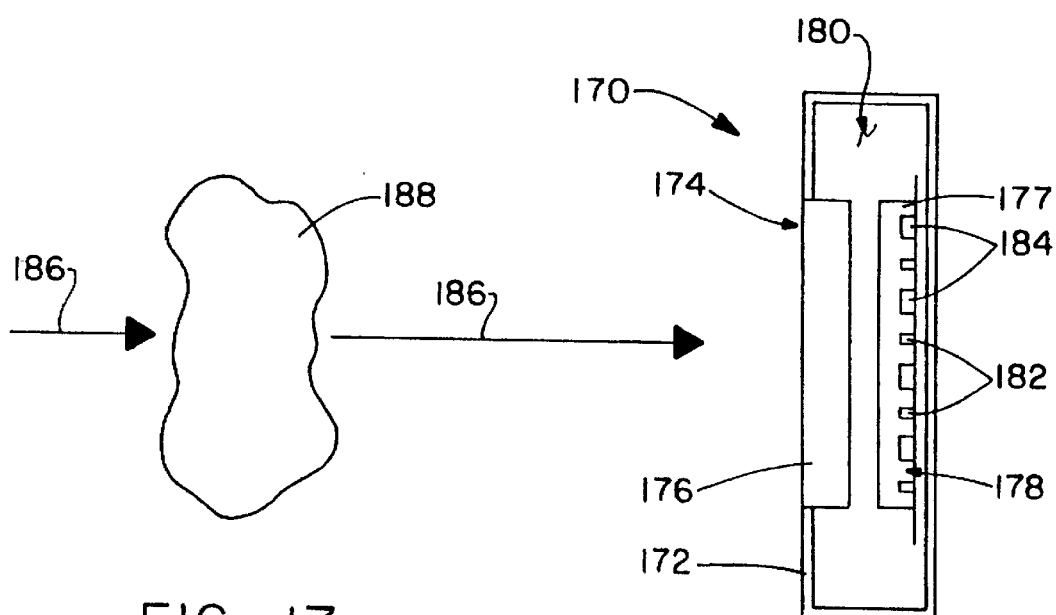
FIG. 17 is a schematic representation of a gas microstrip coupled to a scintillation crystal for use as a photoamplifier according to the present invention.

Referring now to the FIG. 17, it can be seen that another variation of the gas microstrip detector in the form of a hybrid photoamplifier is designated generally by the numeral 170. This embodiment indirectly converts x-rays or gamma rays or UV, visible, infrared light upon direct exposure of a gas microstrip photosensitive substrate, or via any other lightwave media of propagation to an image.

The detector 170 includes a detector housing 172 which provides a window 174 for receiving a scintillation crystal 17. A microstrip substrate 177, which has a photosensitive coating 178, is received in the housing 172. A gaseous medium 180, which is usually a noble gas provided at an atmospheric or substmospheric operating gas pressure, is captured within the housing 172. Disposed on the substrate 177 are a plurality of anodes 182 interleaved with a plurality of cathodes 184. An electrical potential (not shown) is applied between the alternating the anodes 182 and the cathodes 184.

A plurality of x-rays or gamma rays, as represented by arrow 186, are directed through a subject 188 which are then incident upon the scintillating crystal 176 to produce light which illuminates the substrate 177. Photoelectrons are then emitted from the photosensitive area of the coating 178 and initiate avalanche multiplication around the anodes 182 on the substrate 177. The ionic signal is then captured on the cathodes 184.

Figure 17A:
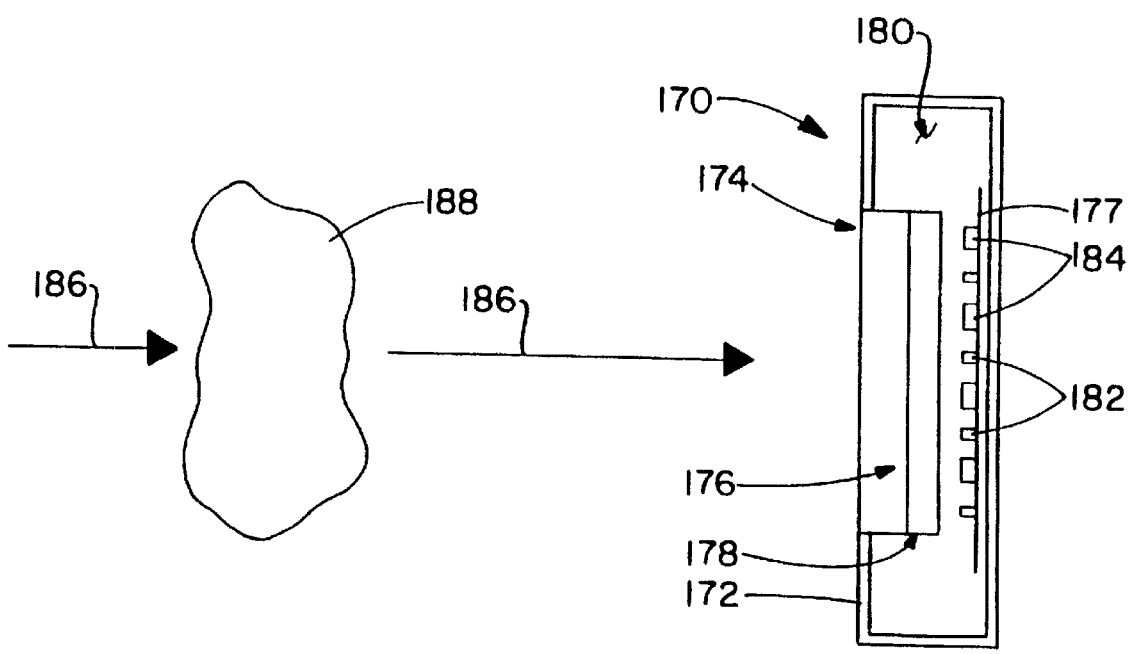
FIG. 17A is a first alternative photoamplifier according to the present invention.

A first alternative is presented in FIG. 17A wherein the photosensitive coating 178 is applied directly to the rear surface of the crystal 176 instead of the substrate 177. In this alternative, an applied electric field between the coating 178 and the anode strips 182 allows the electrons to drift toward the substrate 177 where electron multiplication takes place and the electrons are collected on the anode strips 182.

Figure 17B:
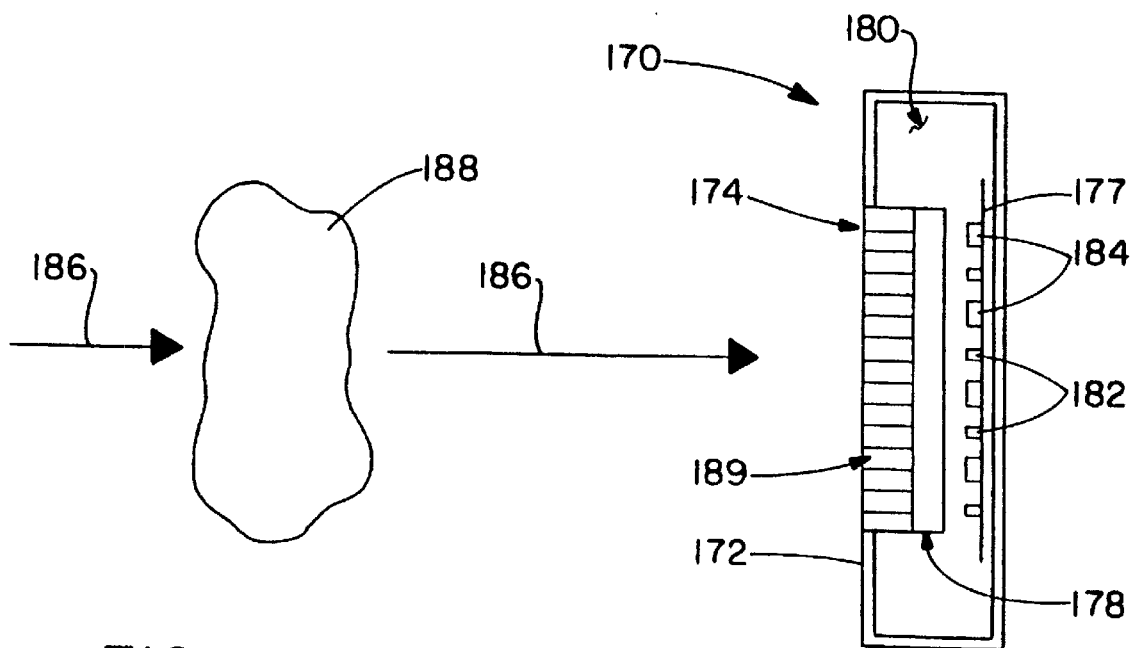
FIG. 17B is a second alternative photoamplifier according to the present invention.

A second alternative is presented in FIG. 17B wherein the crystal is replaced with a fiber optical plate 189 which has a photosensitive coating 178 applied to the rear surface thereof. In addition the system can be used without a crystal or optical system for applications where direct exposures of the photosensitive located substrate receives incident light. Applications in which this occurs include optical microscopy including confocal microscopy and other light wave applications.

Figure 18:
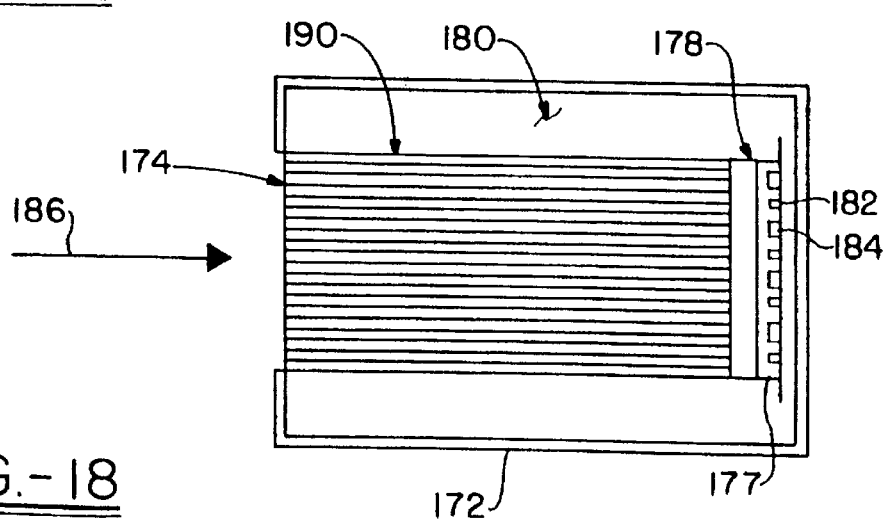
FIG. 18 is a schematic representation of a gas microstrip coupled to scintillating fibers for use as a photoamplifier according to the present invention.

An alternative to these embodiments is presented in FIG. 18, wherein a plurality of scintillating fibers 190 are coupled directly to the coating 178. An applied potential difference between the coating 178 and the anodes 182 allow the produced photoelectrons to drift toward the anodes where avalanche multiplication takes place, whereupon the image signal is detected on the cathodes 184. It will be appreciated that a lens may be coupled directly to the coating 178 instead of the optical fibers.

Accordingly, the applicability of the gas microstrip detection principles to x-ray medical imaging and nuclear medicine results in imaging systems with enhanced detector and image performance parameters is readily apparent. Advantages of the detectors of the present invention include high spatial, contrast, and energy resolution, resulting from the fine collector size, double layer geometry, and high gain. Also provided are: i) high gain achieved with allow applied voltage, due to the high local electric fields generated near the anodes; ii) large produced signals due to the high gain and high quantum efficiency; iii) extremely small signal collection time due to the small anode cathode separation, high drift velocity caused by the high electric fields, and small value of microstrip capacitance; and iv) high signal-to-noise ratio due to the high gain, and low microstrip a capacitance; v) high mechanical stability, low cost, and large design size.

Thus it can be seen that the objects of the invention have been attained by the structure and methods presented above. While in accordance with the patent statutes only the best mode and preferred embodiment of the invention have been described in detail, the invention is not limited thereto or thereby. Accordingly, for an appreciation of the true scope and breadth of the invention, reference should be made to the following claims.

What is claimed is:

1. A gas microstrip detector which receives incident radiation through a subject to generate an image, comprising:
   a substrate having a first surface;
   a plurality of alternating anodes and cathodes disposed on said first surface;
   a plurality of electrodes disposed on an opposite surface of said substrate and oriented substantially perpendicularly with respect to said plurality of alternating anodes and cathodes, said plurality of electrodes separated into a front zone and a back zone;
   a detector cathode spaced apart from and facing said first surface; and
   a zone for disposing a gaseous medium between said substrate and the detector cathode and for receiving incident radiation imparted through the subject, wherein said front zone generates a first image signal and said back zone generates a second image signal for comparison to said first image signal.

2. The detector of claim 1, wherein the gaseous medium is selected from the group consisting of argon, xenon, krypton, and mixtures thereof, and at least one of argon, xenon, krypton and their mixtures in combination with at least one of a polar and a quenching compounds.

3. The detector of claim 2 wherein the gaseous medium is maintained at a predetermined pressure in a direct ionization mode to provide a high quantum efficiency and a reduced electron range.

4. The detector of claim 1, wherein the incident radiation is imparted from a scanning beam geometry.

5. The detector of claim 1, further comprising an imaging system for receiving and processing said first and second image signals.

6. The detector of claim 1, wherein said plurality of alternating anodes and cathodes are photolithographically disposed on the substrate.

7. The detector of claim 6, wherein said substrate is at least partially insulated and wherein a Kumakhov lens or a plurality of capillary optics is coupled with said substrate to provide an enhanced image.

8. The detector of claim 6 further comprising a neutral zone between said front and back zones, the neutral zone facilitating a distinction between the first and second image signals.

9. The detector of claim 6 further comprising:
   a pre-filter for producing a bimodal x-ray spectrum that is passed through the subject; and
   a detector housing which carries a window through which the bimodal x-ray spectrum is passed, wherein the substrate is received within the detector housing.

10. The detecotr of claim 1, wherein the detector cathode is disposed between a radioactive plate source and the substrate to provide means for quantitative autoradiography.

11. The detector of claim 10, wherein said radioactive plate source emits a predetermined level of radiation to ionize said gas detection medium.

12. The detector of claim 1 further comprising:
   a photo-tube for receiving the substrate and filled with the gaseous medium to implement positron emission tomography, gamma camera, computer tomography or single photon emission tomography.

13. The detector of claim 12 further comprising:
   a primary detection region and a transfer gap within the photo-tube; and
   a readout circuit coupled to the phototube to generate an image.

14. The detector of claim 13 further comprising:
   a radiation source adjacent said photo-tube for generating radiation and providing a start pulse to said readout circuit;
   a crystal for absorbing radiation from said radiation source and generating scintillation light for ionizing the gaseous medium which generates a plurality of photoelectrons in an adjacent conversion zones;
   a preamplification grid adjacent said conversion zone to multiply said plurality of electrons;
   a mesh between said preamplification grid and said substrate to register a coincidence event and generate a stop plus received by said readout circuit wherein said detector generates a position reading and said readout circuit, determines a difference between said start and stop pulses for association with said position reading.

15. The detector according to claim 1 further comprising a semiconductor substrate disposed between the substrate and a plate wherein a voltage is applied between the plate and said plurality of electrodes, and wherein said gas medium is encapsulated at a predetermined pressure.

16. The detector according to claim 15 wherein electrons are produced by direct x-ray ionization of the semiconductor substrate and are drifted toward the first plurality of anode strips to generate the image and wherein the incident radiation is imparted from a scanning beam geometry.

17. The detector according to claim 1 further comprising a photosensitive coating disposed over the substrate wherein said substrate is coupled to means for generating light that is exposed to the incident radiation, and wherein said gas medium is encapsulated at a predetermined pressure.

18. The detector according to claim 17 wherein said means for generating light is a scintillation crystal carried by a window of a detector housing.

19. The detector according to claim 1 further comprising
   a detector housing providing a window which receives one of a scintillator crystal and a fiber optic plate, said housing also receiving said substrate; and
   a photosensitive coating disposed on a surface of one of said scintillator crystal and said fiber optic plate.

20. The detector according to claim 17 wherein said means for generating light is a plurality of scintillating fibers coupled to the photosensitive coating and carried in a detector housing.

21. A method for obtaining an image of a subject exposed to incident radiation comprising the steps of:
   exposing a detector to incident radiation projected through a sample,
   wherein the detector comprises a gas microstrip detector, including
      a substrate having on a first surface a plurality of alternating anodes and cathodes,
      a detector cathode spaced apart from and opposing the substrate first surface,
      a plurality of electrodes disposed on an opposite surface of said substrate and oriented substantially perpendicularly with respect to said plurality of alternating anodes and cathodes, said plurality of electrodes separated into a front zone and a back zone, and
      a zone for disposing a gaseous medium between the substrate and the detector cathode and for receiving incident radiation from the sample, wherein the incident radiation produces photons by ionization of the gaseous medium;
   absorbing the photons in said detector, by applying an electric field between the detector cathode and said plurality of electrodes to produce a first image signal detected by said front zone and a second image signal detected by said back zone; and
   producing an imaging signal from said first and second image signals.

22. The method of claim 21 wherein the gaseous medium is selected from the group consisting of argon, xenon, krypton, and mixtures thereof, and at least one of argon, xenon, krypton and their mixtures in combination with at least one of a polar and a quenching compounds.

23. The method of claim 22 wherein the gaseous medium is maintained at a predetermined pressure in a direct ionization mode to provide a high quantum efficiency and a reduced electron range.

24. The method of claim 21 further comprising the step of
   applying an electric field between the detector cathode and said plurality of electrodes to produce said imaging signal.

25. The method of claim 24, further comprising the step of
   providing an imaging system for receiving and processing said imaging signal.

26. The method of claim 25 wherein said step of exposing includes the step of imparting the incident radiation from a scanning beam geometry or an open beam geometry.

27. The method of claim 21, further comprising the step of
   photolithographically disposing the plurality alternating anodes and cathodes on the substrate.

28. The method of claim 27, further comprising the steps of providing said substrate at least partially insulated and coupling one of a Kumakhov lens or a plurality of capillary optics with said substrate to provide an enhanced image.

29. The method of claim 21 further comprising the step of
   providing a neutral zone between said front zone and said back zone, the neutral zone facilitating a distinction between the first and second image signals.

30. The method of claim 21 further comprising the steps of:
   inserting a pre-filter between the incident radiation and the subject to produce a bimodal x-ray spectrum that is passed through the subject; and
   directing the bimodal x-ray spectrum through a detector housing which carries a window through which the bimodal x-ray spectrum is passed, wherein the housing carries the substrate.

31. The method of claim 21, further comprising the step of
   disposing the detector cathode between a radioactive plate source and the substrate to provide means for quantitative autoradiography.

32. The method of claim 31, further comprising the step of
   emitting a predetermined level of radiation to ionize said gas detection medium.

33. The method of claim 21 further comprising the step of
   inserting the substrate into a photo-tube filled with the gaseous medium to provide means for positron emission tomography gamma camera, computer tomography or single photon emission tomography.

34. The method of claim 33 further comprising the steps of
   providing a primary detection region and a transfer gap within the photo-tube; and
   coupling a readout circuit to the phototube to generate the imaging signal.

35. The method of claim 34 further comprising the steps of
   providing said primary detection region with a crystal for absorbing radiation from a radiation source adjacent the photo-tube, said radiation source generating a start signal received by said readout circuit;
   generating scintillation light from the crystal for ionizing the gaseous medium which generates a plurality of photoelectrons;
   multiplying said plurality of electrons in a preamplification grid to generate a signal received by said readout circuit; and
   providing a mesh between said preamplification grid and said substrate to register a coincidence event and generate a stop pulse received by said readout circuit, wherein said detector generates a position reading and said readout circuit determines a difference between said start and stop pulses for association with said position reading.

36. The method of claim 21 further comprising the steps of
   disposing a semiconductor substrate between the substrate and a plate, wherein a voltage is applied between the plate and said plurality of electrodes; and
   pressurizing said gas medium to a predetermined pressure.

37. The method claim 36 further comprising the steps of
   imparting radiation from a scanning beam geometry; and
   producing electrons by direct x-ray ionization of the semiconductor substrate, wherein the electrons are drifted toward the first plurality of anode strips to generate the imaging signal.

38. The method of claim 21 further comprising the steps of
disposing a photosensitive coating over the substrate; and
coupling the substrate to means for generating light that is exposed to the incident radiation.

39. The method of claim 38 further comprising the step of providing a scintillation crystal carried by a window of a detector housing.

40. The method of claim 39 further comprising the steps of
providing a detector housing with a window which receives one of a scintillator crystal and a fiber optic plate, said housing also receiving said substrate; and
disposing a photosensitive coating on a surface of one of said scintillator crystal or said fiber optic plate.

41. The method of claim 38 further comprising the step of providing a plurality of scintillating fibers coupled to the photosensitive coating and carried in a detector housing.

* * * * *